United States Patent
Ellouze et al.

(10) Patent No.: US 9,369,503 B2
(45) Date of Patent: Jun. 14, 2016

(54) ADAPTABLE DATA STREAM TRANSMISSION

(75) Inventors: Selim Ellouze, Lannion (FR); Gaël Fromentoux, Pleumeur Bodou (FR); Xavier Marjou, Lannion (FR)

(73) Assignee: ORANGE (FR)

( * ) Notice: Subject to any disclaimer, the term of this patent is extended or adjusted under 35 U.S.C. 154(b) by 533 days.

(21) Appl. No.: 13/637,762

(22) PCT Filed: Mar. 30, 2011

(86) PCT No.: PCT/FR2011/050711
§ 371 (c)(1),
(2), (4) Date: Sep. 27, 2012

(87) PCT Pub. No.: WO2011/121237
PCT Pub. Date: Oct. 6, 2011

(65) Prior Publication Data
US 2013/0018986 A1    Jan. 17, 2013

(30) Foreign Application Priority Data

Mar. 31, 2010  (FR) ..................................... 10 52403

(51) Int. Cl.
*G06F 15/16*  (2006.01)
*H04L 29/06*  (2006.01)

(52) U.S. Cl.
CPC ........ *H04L 65/1089* (2013.01); *H04L 65/4084* (2013.01)

(58) Field of Classification Search
USPC ................................................ 709/217, 227
See application file for complete search history.

(56) References Cited

U.S. PATENT DOCUMENTS

| 2004/0083291 A1* | 4/2004 | Pessi | H04L 65/605 709/227 |
| 2009/0044003 A1* | 2/2009 | Berthiaume | G06F 21/57 713/100 |
| 2009/0254657 A1* | 10/2009 | Melnyk et al. | 709/224 |

OTHER PUBLICATIONS

Advanced Video Coding for Generic Audiovisual Services. Series H: Audiovisual and multimedia systems, Infrastructure of audiovisual services—Coding of moving video. International Telecommunication Union H.264, Nov. 2007 in 564 pages.

Information Technology—Coding of audio-visual objects—Part 3:Audio, International Standard ISO/IEC 14496-3:2005(E), Third edition Dec. 1, 2005, in 133 pages.

Wenger et al., RTP Payload for SVC Video, draft-ietf-avt-rtp-svc-20. txt. Internet Draft dated Oct. 26, 2009, in 104 pages.

(Continued)

*Primary Examiner* — Philip B Tran
(74) *Attorney, Agent, or Firm* — Knobbe, Martens, Olson & Bear, LLP (57) ABSTRACT

A method of transmitting a data stream previously coded according to an adaptable coding between a first terminal and a second terminal through the intermediary of a session established according to an HTTP-based transport protocol is disclosed. In one aspect, collection is by the first terminal of a set of context information relating to the session, to the first terminal and to the second terminal. Then, formation is of an adaptation scheme as a function of the set of context information. Next, adaptation is of the data stream by the first terminal as a function of the adaptation scheme. Lastly, transmission is of the adapted data stream by the first terminal to the second terminal.

9 Claims, 4 Drawing Sheets

(56) References Cited

OTHER PUBLICATIONS

Hellwagner et al., "Interoperable Adaptive Multimedia Communication", IEEE Multimedia, IEEE Service Center, New York NY, vol. 12, No. 1, pp. 74-79, Jan. 1, 2005.

Smith, Ric, "The Future of the Web: HTML5 Web Sockets", pp. 1-6 Sep. 16, 2008. Retrieved from http://ricsmith.sys-con.com/node/677813, retrieved on Nov. 24, 2010.

International Search Report and Written Opinion from International Application No. PCT/FR2011/050711, dated Sep. 6, 2011, in 14 pages.

International Search Report from International Application No. PCT/FR2011/050711, dated Sep. 6, 2011, in 10 pages.

\* cited by examiner

ADAPTABLE DATA STREAM TRANSMISSION

The field of the invention is that of data stream transmission in a telecommunications network.

The present invention relates more particularly to adaptable data stream transmission between a server and a terminal between which a session adhering to the HTTP protocol or to an HTTP-based protocol is open.

By way of exemplary adaptable data stream, "Scalable Video Coding" (SVC) is a standardized technology [Amendment 3 to ISO/IEC 14496 MPEG-4 Part 10] for video content compression used to effect an adaptation of the content in three different dimensions: either in the spatial dimension (various resolutions of the video), or the temporal dimension (various frequencies) or the quality dimension (various SNRs "Signal to Noise Ratios"). The video stream is composed of several sub-streams, called layers. A typical example is the separation of a video stream into 2 layers: a base layer and an enhancement layer. For example, when the bandwidth between the client and the server is restricted, only the base sub-stream is dispatched to the client. When the bandwidth between the client and the server increases, the enhancement sub-stream is added to the stream transmitted to the client. It should be noted that the SVC base layer is MPEG4-AVC compatible that most current terminals and servers implement.

The transport of the SVC video content is carried out by the RTP protocol (Real-time Transport Protocol), undergoing standardization at the IETF [draft-ietf-avt-rtp-svc-20].

But the RTP protocol is not entirely satisfactory, in particular for the following reasons:

- the major problem is that the RTP stream cannot pass the firewalls which block the traffic on any port other than the Web port 80,
- the RTP stream must generally be transmitted from the server (public zone) to the client (private zone), this requiring extremely difficult NAT (Network Address Translation) passage,
- the RTP protocol is not innately integrated into Web browsers and additional modules are necessary,
- it is difficult, in the presence of NAT, at the level of the VOD (Video On Demand) server, to effect the link between the control streams (e.g.: SIP or RTSP) and the RTP streams,
- the SVC video streams transported by RTP need to be synchronized with the audio streams transported in another RTP session.

This is why other protocols are envisaged, such as the HTTP (HyperText Transfer Protocol) protocol or the WSP (Web Socket Protocol) protocol, which is based on HTTP, while affording improvements thereto.

The use of HTTP as transport protocol presents several advantages since this protocol solves a certain number of problems. On the one hand, the port 80 associated with the HTTP data is not blocked by the intermediate equipment items (proxy, firewall, etc.) which is not the case for the ports associated with other protocols. Secondly, the HTTP protocol is an open protocol and HTTP servers are widely deployed, thus offering an already existing pool ready for utilization. Thirdly, the HTTP protocol is a data transfer protocol and therefore may be utilized to multiplex various kinds of data such as "chat", on-line votes, question/answer interactive games, etc., thereby enriching the conventional multimedia sessions and offering a wide gamut for innovative applications.

The WSP protocol is a development of the HTTP protocol which can utilize the same transport session as the latter: conventional port 80 or secure port 443. The WSP protocol makes it possible in addition to have a two-way communication pathway between two ends without resorting to opening several HTTP sessions. The data may be transmitted in "Push" mode, this being very beneficial for streams with delay constraints.

Thus, techniques of adaptive "streaming" over HTTP have been developed to offer users a better quality of experience (QoE) by offering possibilities of adaptation during a session. This entails toggling between the streams available server side, exclusively as a function of bandwidth.

These are proprietary solutions. For example, use is made of a conventional Web server and a client to be downloaded or else implemented by default on the client terminal. Server side, the audiovisual stream is sliced into segments each containing a certain duration of time of the stream (for example 10s). It should be noted that the slicing of the files into chunks is not standardized and that each of the promoters of this technique has used their own solution. The reassembling of the segments client side restores the decodable stream. The server creates a new link for each segment and stores it in an indexation file. The client downloads this file when he requests the stream and thereafter begins to download the segments from the links that he finds in the file. This indexation file is formatted in accordance with models defined by each firm. This file contains other information about the segments and the stream. The indexation file must be downloaded periodically to ascertain the links to the new segments. As a function of the information received and of his estimation of the bandwidth, the client decides segments to be downloaded.

The known techniques of adaptive streaming over HTTP present a certain number of drawbacks. It is possible to cite for example:

Initial waiting duration: The indexation files must contain three or more segments before being available for downloading. For "live" contents, it is necessary to wait for the encoding and indexation of at least three segments, thereby rendering the initial waiting duration between the instant of request of the stream and the instant of reading significant. In "live streaming" and with a segment size equal to 10 s, it may reach 30 seconds.

The index files generate problems. It is necessary to download an index file and update it periodically. This file contains the links to the segments of the media file and information about the segments, their structuring and the data that they transport. This procedure presents 3 major drawbacks:

The periodic requests/responses between the server and the clients waste bandwidth and constitute extra load for the servers.

The indexation file requires a reliable service since non-receipt or the presence of error may engender cutoffs.

The cache mechanisms in Web gateways may prevent the updating of the last indexation file created by the server and the transmission of the last file saved in the cache of the gateway.

The streams are static and of predetermined format: The various representations of the stream propose different bitrates but are predetermined. Clients must choose from what exists and cannot lay claim to a customized adaptation. In parallel, slicing the stream into segments of equal size does not make it possible to comply with the limits of the packets and Intra-coded images. These images constitute the point of toggling between different representations of one and the same content. This slicing therefore minimizes the possible number of toggling points between the various representations.

The adaptation is rudimentary: The proposed techniques support only toggling between different representations of quality but not of different features such as spatial resolution or temporal frequency.

The server is passive: The decision to toggle to a better adapted stream is taken client side only. The server is not capable of intervening.

The aim of the present invention is to solve the drawbacks of the prior art.

To this end, the invention proposes a method of transmitting a data stream previously coded according to an adaptable coding between a first terminal and a second terminal by way of a session established according to an HTTP-based transport protocol, characterized in that it comprises the steps of:
  collection by the first terminal of a set of context information relating to the session, to the first terminal and to the second terminal,
  formation of an adaptation scheme as a function of the set of context information,
  adaptation of the data stream by the first terminal as a function of the adaptation scheme,
  transmission of the data stream adapted by the first terminal to the second terminal.

By virtue of the invention, the context information transmitted to the first terminal makes it possible to carry out optimized adaptation for each user client of the second terminal and for each event affecting the session. For example, a client changing screen size during viewing will instantaneously receive a stream of spatial resolution adapted to the new screen size.

The invention does not use any indexation file, thereby allowing economy of bandwidth and better reliability.

The duration of initial waiting before the start of reading depends only on the duration of establishment of the transport session. In order to be able to transmit an indexation file to the client there is no need to wait for the encoding of three whole segments as is the case for the other techniques. The first packet is transmitted to the second terminal at the start of a session and allows instantaneous viewing by the client while waiting for the reception of the initial context of the client and the adaptation of the stream as a function of this context.

According to a preferred feature, the steps of collection, formation, adaptation and transmission are performed upon initialization of the session and during the session. Thus, the transmission of the adaptable stream is optimized not only as a function of the context defined upon initialization of the session, but also as a function of the possible alterations in the context.

According to a preferred feature, the collection step comprises the reception of a signaling message transmitted by the second terminal. Thus the context specific to the second terminal is taken into account to optimize the transmission of the adaptable stream.

The invention also relates to a method of receiving a data stream previously coded according to an adaptable coding between a first terminal and a second terminal by way of a session established according to an HTTP-based transport protocol, characterized in that it comprises the steps of:
  collection by the second terminal of a set of context information relating to the session, to the first terminal and to the second terminal,
  reception of the data stream by the second terminal,
  formation of an adaptation scheme as a function of the set of context information,
  adaptation of the data stream by the second terminal as a function of the adaptation scheme.

Thus the second terminal is capable of performing an additional adaptation of the stream before the latter is played for a user.

According to a preferred feature, the collection step comprises the reception of a signaling message transmitted by the first terminal. Thus the context specific to the first terminal is taken into account for the additional adaptation of the adaptable stream.

The invention also relates to a telecommunications equipment item capable of transmitting a data stream previously coded according to an adaptable coding to a second terminal by way of a session established according to an HTTP-based transport protocol, characterized in that it comprises:
  means for collecting a set of context information relating to the session, to the equipment item and to the second terminal,
  means for forming an adaptation scheme as a function of the set of context information,
  means for adapting the data stream as a function of the adaptation scheme,
  means for transmitting the adapted data stream to the second terminal.

This telecommunications equipment item is for example a server.

The invention further relates to a telecommunications equipment item capable of receiving a data stream previously coded according to an adaptable coding from a first terminal by way of a session established according to an HTTP-based transport protocol, characterized in that it comprises:
  means for collecting a set of context information relating to the session, to the first terminal and to the equipment item,
  means for receiving the data stream,
  means for forming an adaptation scheme as a function of the set of context information,
  means for adapting the data stream as a function of the adaptation scheme.

This telecommunications equipment item is for example a client terminal.

These various equipment items present advantages analogous to those of the methods presented previously.

In a particular embodiment, the various steps of the methods according to the invention are determined by instructions of computer programs.

Consequently, the invention is also aimed at a computer program on an information support, this program being able to be implemented in a computer, this program comprising instructions adapted to the implementation of the steps of a method such as described hereinabove.

This program can use any programming language, and be in the form of source code, object code, or of code intermediate between source code and object code, such as in a partially compiled form, or in any other desirable form.

The invention is also aimed at an information support readable by a computer, and comprising instructions of the computer programs such as mentioned hereinabove.

The information support may be any entity or device capable of storing the program. For example, the support can comprise a storage means, such as a ROM, for example a CD ROM or a microelectronic circuit ROM, or else a magnetic recording means, for example a diskette (floppy disk) or a hard disk.

Moreover, the information support may be a transmissible support such as an electrical or optical signal, which may be conveyed via an electrical or optical cable, by radio or by other means. The program according to the invention may be in particular downloaded from a network of Internet type.

Alternatively, the information support may be an integrated circuit into which the program is incorporated, the circuit being adapted to execute or to be used in the execution of the method in question.

Other features and advantages will become apparent on reading preferred embodiments described with reference to the figures in which.

Figure 1:
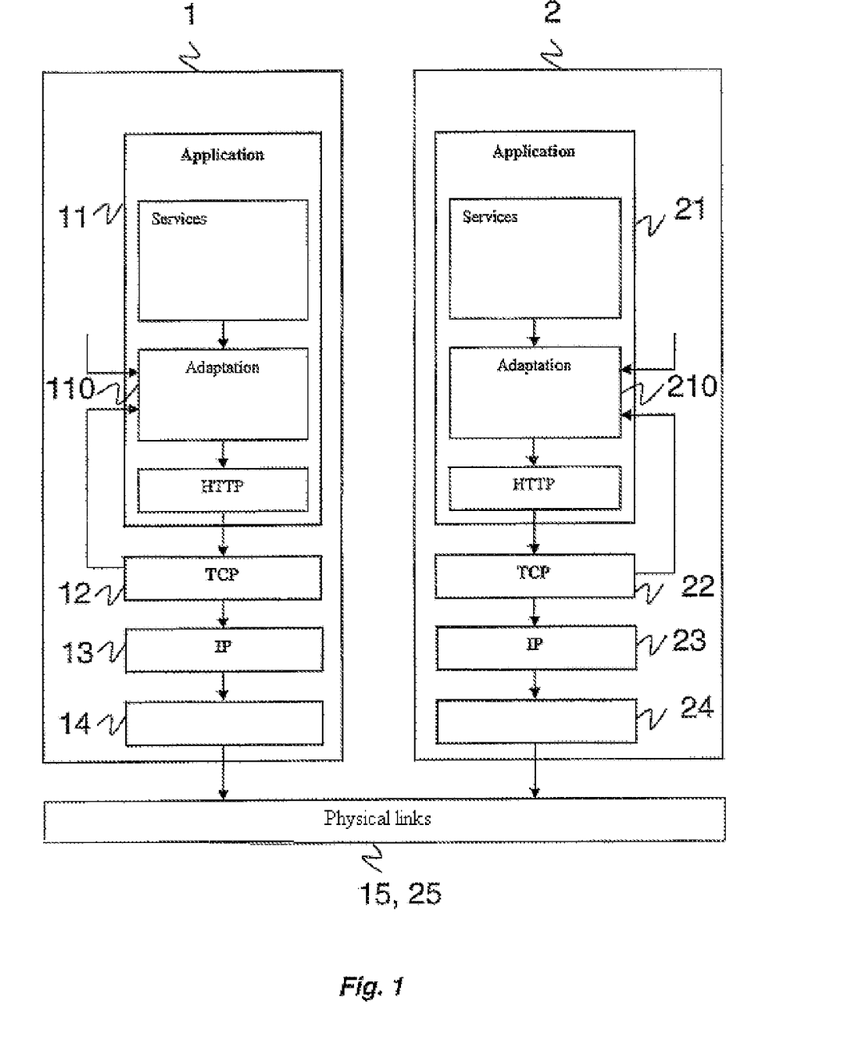
FIG. 1 represents an embodiment of devices according to the invention.

According to one embodiment of the invention, represented in FIG. 1, the equipment items implementing the invention are a first terminal which is a server 1 and a second terminal which is a client terminal 2. The server 1 and the client terminal 2 comprise conventional means for communicating by using the HTTP protocol or according to an HTTP-based protocol such as the HTTPS ("Secured") protocol or the WSP (Web Socket Protocol) protocol or else the WSP protocol tunneled over TLS.

The layered architecture of the server 1 and of the terminal 2 is briefly described, beginning with the upper layer. The application layer 11, 21 comprises an application part proper and uses the HTTP protocol. The TCP protocol (Transmission Control Protocol) is used at the level of the transport layer 12, 22. The IP protocol (Internet Protocol) is used at the level of the network layer 13, 23. The data link layer 14, 24 specifies in particular the screening of the data packets. Finally the physical layer 15, 25 relates to the physical features of the link.

In a conventional manner, the link between the server and the terminal uses intermediate equipment items of a telecommunications network, such as gateway, proxy server, which will not be described here. We consider only the server 1 and the client terminal 2 which are the end equipment items of the link.

We consider more particularly the case where the server is able to transmit an adaptable multimedia stream to the terminal.

An adaptable multimedia stream is for example a stream of SVC (Scalable Video Coding) type.

According to the invention, an adaptation module 110, 210 is added at the level of the application layer of the server and of the client terminal.

In the case where the invention is implemented between two terminals communicating according to a peer-to-peer mode, there is establishment of a WSP session which is by nature bidirectional or of two distinct HTTP sessions, to transport the data streams in both directions.

Figure 2:
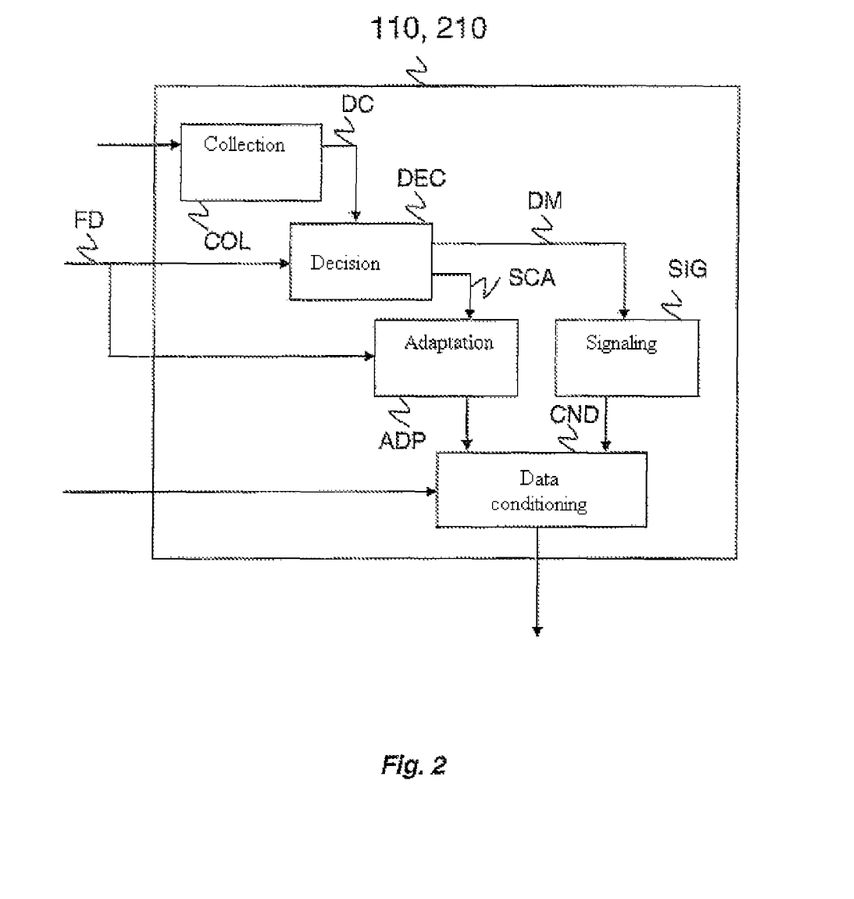
FIG. 2 represents an embodiment of an adaptation module according to the invention.

With reference to FIG. 2, the adaptation module according to the invention, be it the adaptation module 110 of the server 1 or the adaptation module 210 of the terminal 2, comprises a set of sub-modules or functions.

Function for Collecting Useful Events and Information

The collection function COL is capable of interfacing with:
various entities of the terminal so as to determine its hardware features and its capabilities (network cards, graphical processors, CPU, memory, battery, change of screen (mobile as an STB), user application commands (e.g.: video recorder commands forward/reverse slow/fast, pause", etc.), the user so as to determine his rights, authenticate him or ascertain his preferences, the transport session so as to determine the current state of the link (bandwidth, delay, jitter, etc.).

Together, this information defines the context. A context is a set of information which characterizes the environment of an entity. For a streaming session, the context is the set of information related to this session. This is a question of both ends (the hardware capabilities of the server and of the client), of the link between the two (bandwidth nature, etc.), of the user (credit, preferences, history, etc.).

This context is dynamic since several items of information may vary in the course of time. This is why the context is defined upon initialization of the session and is then updated during the session so as to track the alterations in the various components of the context.

The context information as a whole is aggregated into a context descriptor DC.

The context descriptor DC comprises three sections:

Global context: contains general information about the session (Live, VoD, protected content, authorized country, etc.)

Context specific to the server: describes the information relating to the server (address, proprietor, state, types of streams supported, authentication mechanisms, etc.)

Context specific to the client: The information about the environment of the client (hardware features, CPU-memory-Buffer decoding capabilities, Battery, display resolution of the graphical processor, network interface, client preferences, etc.).

The collection of context information is carried out equally well client terminal side and server side. As will be seen hereinafter, the context descriptor generated at one end is shaped and transmitted to the other end, so that this context information is processed by the collection function of the other end.

Decision Function

The decision function DEC receives the adaptable data stream FD and the context descriptor DC. The decision function analyzes the information collected, and then defines case by case an optimized adaptation scheme SCA which is utilized by the adaptation function described hereinafter. A distinction is drawn between the operation of the decision function server side and terminal side.

1. Server Side:

The main processing operations carried out by the decision function are:

Analysis of the structure of the adaptable stream. To be able to perform optimal adaptation, it is necessary to be able to take into account all the available possibilities of adaptation and ascertain all the features of the stream. The adaptation module needs to know exactly:

The structure of the stream (the set of layers which form the stream and the dependency relations which exist between them)

The features of the layers which form the stream (spatial resolution (QCIF, HD, etc.) quality, significance of each layer, etc.)

The non-intuitive adaptations (for example transcoding of several SVC layers into an MPEG-4 compatible layer) supported by the stream. These adaptations may be deduced from a thorough analysis of the stream and in certain encoding standards they are signaled in particular messages.

All this information will be saved in the media descriptor structure DM and more precisely in the three sections that it defines: "Media content structure", "media content features" and "media content adaptability". This structure may be transmitted:

- to the client to allow him to perform additional adaptations if he so desires.
- to the intermediate equipment items "Media Aware Network Equipment (MANE)" capable of performing adaptations in core or network periphery.
- Processing of the information collected by the collection function (server load, state of the outgoing links, etc.) and of the information about the context dispatched by the client so as to determine an adaptation scheme SCA which is most in phase with its context.
- Definition of the optimal adaptation scheme (set of actions to be carried out so as to modify the starting stream into an optimal stream for the current context of the session with the client).
- Determination of the relevant information to be transmitted to the Signaling function for dispatch to the client.

2. Client Side:

The main processing operations carried out by the decision function are:

- Processing of the information collected by the collection function (client state, user preferences, etc.) and of the context information dispatched by the server so as to perform an additional adaptation if necessary.
- Determination of the relevant information about the context to be transmitted to the signaling function for dispatch to the server.

The decision function DEC transmits the context descriptor DC and the media descriptor DM to the signaling termination function described further on. It also transmits the adaptation scheme SCA to the adaptation function.

Audiovisual Content Adaptation Function

The adaptation function ADP receives the adaptable stream FD and the adaptation scheme SCA established by the decision function. It carries out the adaptation proper of the content of the adaptable stream, as a function of the adaptation scheme, so as to restore an adapted stream as output.

Signaling Termination Function

The signaling termination function SIG ensures communication between the equipment items participating in the session.

Server side, this function receives the context descriptor DC and the media descriptor DM and shapes them with a view to their transmission to the client terminal. This transmission is carried out at the start of the session and during the session on the fly.

Client terminal side, this function receives the context descriptor DC and shapes it with a view to its transmission to the server. This transmission is carried out at the start of the session and during the session on the fly.

For the real-time transmission of the context it is possible to use a protocol for describing the "Capabilities & Current Context Protocol" (CCCP) or as a variant an XML file.

Data Conditioning Function

In the case of the WSP protocol, the establishment of the Web Socket session makes it possible to multiplex several data sessions. The data conditioning function CND makes it possible in particular to distinguish in the global data stream the various types by using fields in the TLV (Type, Length, Value) format.

Figure 3:
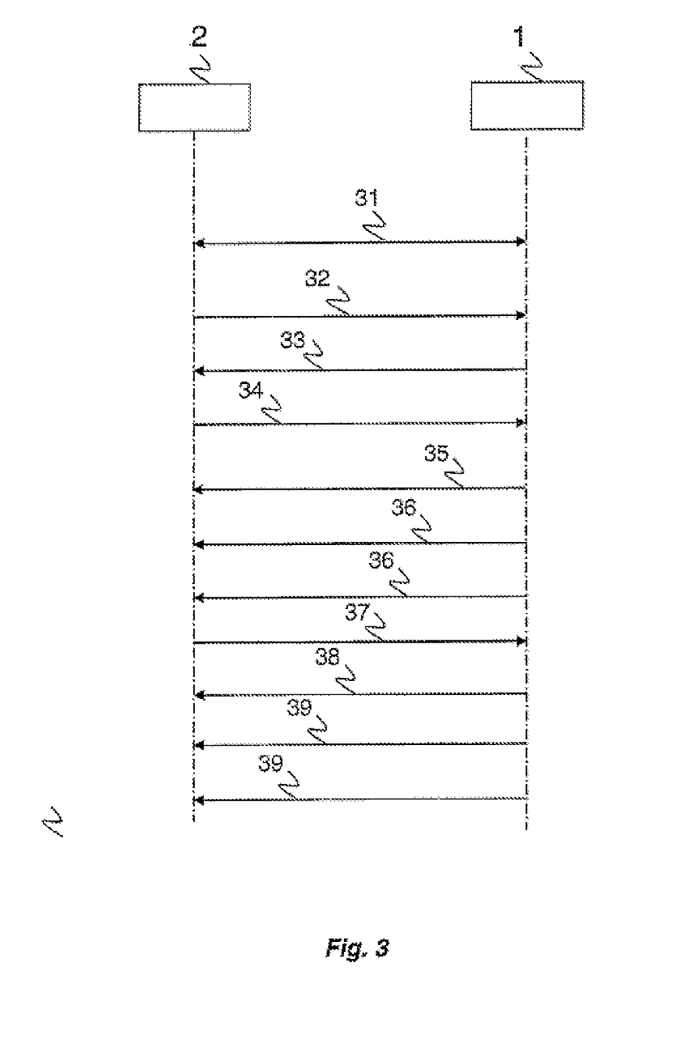
FIG. 3 represents an exemplary diagram of exchanges between a server and a client terminal according to the invention.

FIG. 3 represents a diagram of the exchanges between the server 1 and the client terminal 2 during a session in the course of which an adaptable data stream is transmitted according to the invention.

The exchange 31 is the establishment of the session, according to the HTTP protocol or an HTTP-based protocol. It is assumed that it is the WSP protocol which is used. This session establishment is conventional.

The terminal dispatches a request 32 for an adaptable multimedia stream to the server.

The server dispatches 33 the SVC base layer to the terminal.

The terminal collects the context information and transmits it 34 to the server, according to the CCCP protocol.

The server collects the context information and transmits it 35 to the terminal, according to the CCCP protocol. The collection performed by each of the equipment items includes, in particular, possibly receiving and taking into account the context information of the other equipment item.

It should be noted that if the terminal does not transmit any context information, for example because it does not possess the appropriate module, the server will nonetheless be capable of performing an adaptation of the stream as a function of the context information that it has collected.

The server forms an adaptation scheme, adapts the stream as a function of the context information and transmits 36 the adapted stream to the terminal. The adapted stream comprises for example the base layer and a stream enhancement layer SCV. Furthermore, the server transmits a media descriptor to the terminal.

The terminal forms an adaptation scheme, performs additional adaptations on the stream received as a function of the context information and then restores the adapted stream to the user.

The terminal again collects the context information and transmits 37 this context information to the server, said information incorporating for example a change of a parameter with respect to the transmission 34, according to the CCCP protocol.

Likewise, the server again collects the context information and transmits 38 this context information to the terminal. As previously, the collection performed by each of the equipment items includes, in particular, possibly receiving and taking into account the context information of the other equipment item.

The server again forms an adaptation scheme, readapts the stream as a function of the context information and transmits 39 the adapted stream to the terminal.

As previously, the terminal forms an adaptation scheme, performs additional adaptations on the stream received as a function of the context information and then restores the adapted stream to the user.

Figure 4:
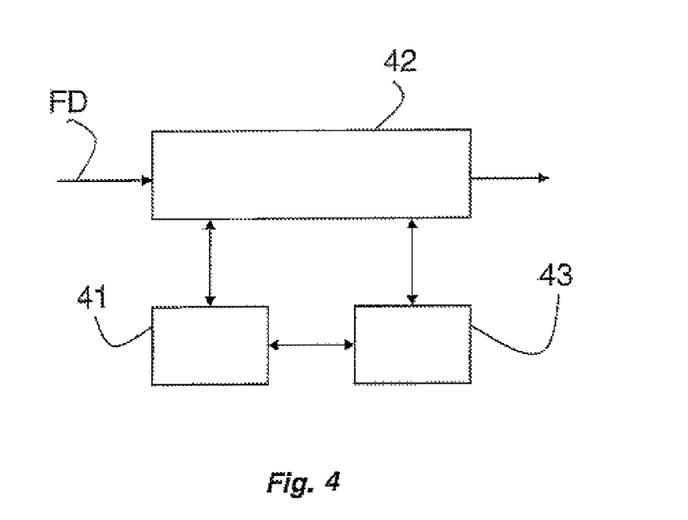
FIG. 4 represents an embodiment of a device according to the invention.

FIG. 4 represents a first equipment item, such as a server 1 according to the invention. This server implements the adaptable stream transmission method according to the particular embodiment described hereinabove.

Such a device comprises in particular a memory 41 consisting of a buffer memory, a processing unit 42, equipped for example with a microprocessor, and driven by the computer program 43, implementing the method according to the invention.

Upon initialization, the code instructions of the computer program 43 are for example loaded into a RAM memory before being executed by the processor of the processing unit 42. The processing unit 42 receives as input an adaptable data stream FD to be processed. The microprocessor of the processing unit 42 implements the steps of the method previously described, according to the instructions of the computer program 43.

Accordingly, the equipment item is capable of communicating with another equipment item, termed the second terminal, by way of a session established according to an HTTP-based transport protocol, and it comprises:
- means for collecting a set of context information relating to the session, to the equipment item and to the second terminal,
- means for forming an adaptation scheme as a function of the set of context information,
- means for adapting the data stream as a function of the adaptation scheme,
- means for transmitting the adapted data stream to the second terminal.

These means are driven by the microprocessor of the processing unit 42.

Figure 5:
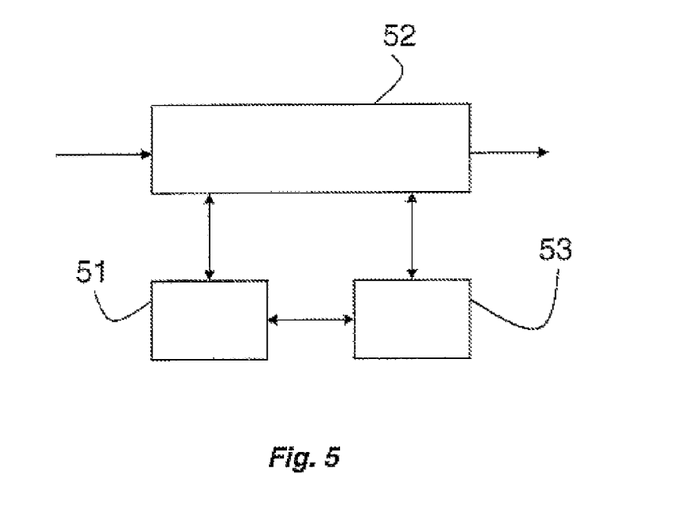
FIG. 5 represents an embodiment of a device according to the invention.

FIG. 5 represents a second equipment item, such as a client terminal 2 according to the invention. This terminal implements the adaptable stream reception method according to the particular embodiment described hereinabove.

Such a device comprises in particular a memory 51 consisting of a buffer memory, a processing unit 52, equipped for example with a microprocessor, and driven by the computer program 53, implementing the method according to the invention.

Upon initialization, the code instructions of the computer program 53 are for example loaded into a RAM memory before being executed by the processor of the processing unit 52. The processing unit 52 receives as input an adapted data stream to be processed. The microprocessor of the processing unit 52 implements the steps of the method previously described, according to the instructions of the computer program 53.

Accordingly, the equipment item is capable of communicating with another equipment item, termed the first terminal, by way of a session established according to an HTTP-based transport protocol, and it comprises:
- means for collecting a set of context information relating to the session, to the first terminal and to the equipment item,
- means for receiving the data stream,
- means for forming an adaptation scheme as a function of the set of context information,
- means for adapting the data stream as a function of the adaptation scheme.

These means are driven by the microprocessor of the processing unit 52.

The invention claimed is:

1. A method of transmitting a data stream previously coded according to an adaptable coding between a first terminal and a second terminal by way of a session established according to an HTTP-based transport protocol, the method comprising:
- collection by the first terminal of a set of context information relating to the session, to features of the first terminal and to features of the second terminal,
- transmission to the second terminal of information relating to the features of the first terminal,
- formation of an adaptation scheme as a function of the set of context information,
- adaptation of the data stream by the first terminal as a function of the adaptation scheme, and
- transmission of the data stream adapted by the first terminal to the second terminal.

2. The method as claimed in claim 1, wherein the collection, formation, adaptation and transmission are performed upon initialization of the session and during the session.

3. The method as claimed in claim 1 wherein the collection comprises the reception of a signaling message transmitted by the second terminal.

4. A method of receiving a data stream previously coded according to an adaptable coding between a first terminal and a second terminal by way of a session established according to an HTTP-based transport protocol, the method comprising:
- collection by the second terminal of a set of context information relating to the session, to features of the first terminal and to features of the second terminal,
- formation of an adaptation scheme as a function of the set of context information,
- reception of the data stream by the second terminal, and
- adaptation of the data stream by the second terminal as a function of the adaptation scheme.

5. The reception method as claimed in claim 4, wherein the collection comprises the reception of a signaling message transmitted by the first terminal.

6. A telecommunications terminal capable of transmitting a data stream previously coded according to an adaptable coding to a second terminal by way of a session established according to an HTTP-based transport protocol, the telecommunications terminal comprising:
- communications equipment configured to collect a set of context information relating to the session, to features of the telecommunications terminal and to features of the second terminal; and
- a processor configured to form an adaptation scheme as a function of the set of context information,
- the processor also configured to adapt the data stream as a function of the adaptation scheme, and
- the communications equipment configured to transmit the adapted data stream to the second terminal and configured to transmit to the second terminal information relating to the features of the telecommunications terminal.

7. A telecommunications terminal capable of receiving a data stream previously coded according to an adaptable coding from a first terminal by way of a session established according to an HTTP-based transport protocol, the telecommunications terminal comprising:
- communications equipment configured to:
  - collect a set of context information relating to the session, to features of the first terminal and to features of the telecommunications terminal; and
  - receive the data stream; and
- a processor configured to:
  - form an adaptation scheme as a function of the set of context information; and
  - adapt the data stream as a function of the adaptation scheme.

8. A non-transitory computer readable data medium having recorded thereon a computer program including instructions for executing a method of transmitting a data stream previously coded according to an adaptable coding between a first terminal and a second terminal by way of a session established according to an HTTP-based transport protocol, when said program is executed by a computer, the method comprising acts of:
- collection by the first terminal of a set of context information relating to the session, to features of the first terminal and to features of the second terminal,
- formation of an adaptation scheme as a function of the set of context information, adaptation of the data stream by the first terminal as a function of the adaptation scheme, and transmission of the data stream adapted by the first terminal to the second terminal.

9. A non-transitory computer readable data medium having recorded thereon a computer program including instructions for executing a method of receiving a data stream previously coded according to an adaptable coding between a first terminal and a second terminal by way of a session established according to an HTTP-based transport protocol, when said program is executed by a computer, the method comprising acts of:

collection by the second terminal of a set of context information relating to the session, to features of the first terminal and to features of the second terminal, formation of an adaptation scheme as a function of the set of context information, reception of the data stream by the second terminal, and adaptation of the data stream by the second terminal as a function of the adaptation scheme.

* * * * *